(12) United States Patent
Fontana (10) Patent No.: US 7,324,331 B2
(45) Date of Patent: Jan. 29, 2008

(54) SYSTEM AND METHOD FOR PROVIDING AND RECEIVING ELECTRIC POWER THROUGH TELEPHONE WIRE-PAIRS

(75) Inventor: Edward C. Fontana, Rockwall, TX (US)

(73) Assignee: Tyco Electronics Power Systems, Inc., Mesquite, TX (US)

( * ) Notice: Subject to any disclaimer, the term of this patent is extended or adjusted under 35 U.S.C. 154(b) by 355 days.

(21) Appl. No.: 11/083,847

(22) Filed: Mar. 18, 2005

(65) Prior Publication Data

US 2005/0226013 A1    Oct. 13, 2005

Related U.S. Application Data

(60) Provisional application No. 60/561,832, filed on Apr. 13, 2004.

(51) Int. Cl.
*H02B 1/26* (2006.01)

(52) U.S. Cl. ............... 361/622; 379/418; 379/399; 363/44; 363/89

(58) Field of Classification Search ........... 363/142, 363/144, 37, 65, 71, 89, 53; 307/25–26, 307/64, 65, 80, 66
See application file for complete search history.

(56) References Cited

U.S. PATENT DOCUMENTS 6,023,037 A * 2/2000 Church et al. ......... 219/121.39
6,903,950 B2 * 6/2005 Afzal et al. .............. 363/142

* cited by examiner

*Primary Examiner*—Rajnikant B. Patel (57) ABSTRACT

Converter modules for providing and receiving electric power through a single telephone wire-pair and related systems and methods. In one embodiment, a converter module for providing electric power to a single telephone wire-pair includes: (1) a DC/DC boost converter configured to receive input power from an existing power supply and an existing distribution bus at a central office and further configured to provide output power to the single wire-pair and (2) a current-limiting converter controller coupled to the DC/DC boost converter and configured to limit a current output of the DC/DC boost converter to the single wire-pair.

23 Claims, 8 Drawing Sheets

SYSTEM AND METHOD FOR PROVIDING AND RECEIVING ELECTRIC POWER THROUGH TELEPHONE WIRE-PAIRS

CROSS-REFERENCE TO RELATED APPLICATION

The present application is based on and claims priority of U.S. Provisional Patent Application Ser. No. 60/561,832, filed on Apr. 13, 2004, by Fontana, entitled "Telephone Pair Powering System with Unique Elements," commonly assigned with the present invention and incorporated herein by reference.

TECHNICAL FIELD OF THE INVENTION

The present invention is directed, in general, to telecommunications power systems and, more specifically, to a system and method for providing and receiving electric power through telephone wire-pairs.

BACKGROUND OF THE INVENTION

Optical fiber has, for several years, been used in telecommunication networks as "backbones" to link central offices (COs) to one another. In contrast, however, ordinary twisted pairs of copper wire ("wire-pairs") have continued to be used as "local loops" to link the COs to customer premises.

Telecommunication companies have now begun the process of transitioning to optical fiber all the way out to customer premises so they can offer the same broadband access as do cable companies. However, unlike wire-pairs, optical fibers by their nature require each customer premises to have terminating equipment ("customer premises equipment" or CPE) so their optical signals can be converted to electrical signals.

Unfortunately, optical fibers are unsuited to convey the electric power the CPE requires to operate. The CPE must derive its electric power from a separate source. Of course, the CPE could be plugged into the commercial power grid at the customer premises. This is a satisfactory solution until the power grid fails. The CPE loses its source of power, and telecommunication services are interrupted until power is restored. Given the historical reliability of the nation's telecommunication system, this is unacceptable.

One approach to ensuring that power to CPE is maintained at the customer premises during power grid failures is to place an uninterruptible power supply ("UPS") at the customer premises. Unfortunately, UPSs are battery-powered and must be monitored and maintained to ensure that they operate when needed.

The other approach is to provide power from the CO to each customer premises using the wire-pairs that the optical fibers superseded. Thus, the wire-pairs become conduits for electric power rather than for telephone conversations. The wire-pairs can provide power all the time or only during grid failures.

Although the latter approach avoids the need for UPSs, using wire-pairs for electric power brings its own complications. The second method historically has used bulk +/−130 to +/−190 volt (V) converters at the CO and bulk converters converting down to a voltage suitable for CPE at the customer premises. These relatively high voltages are necessary given the electrical resistance of the wire-pairs. However, to maintain safety, all wire-pairs used for local loops fall under Class 2 of the National Electrical Code (NEC), which establishes a 100 volt-ampere (VA) limit on the wire-pairs. Therefore, line-dedicated 130/190V current limiters must also be used at the CO to ensure that the 100 VA limit per twisted pair is not exceeded.

This poses several problems. First, the CO must create dedicated equipment rack space to house bulk 130V and/or 190V equipment. Rack space is in high demand. Second, bulk 130/190V power is more dangerous than the 48V power traditionally handled in the rack space and thus places an additional safety burden on both equipment design and field operation procedures. Third, current limiter behavior at the 100 VA limit is problematic at the CO, because limiting transistors contained in the current limiter may operate in their linear region, dissipating power rather than delivering it to the twisted pair. Fourth, the 100 VA limit at the customer premises is also problematic in that the CPE must always draw power below the 100 VA limit but also take into account resistive losses in the twisted pair. The bulk converters at the customer premises must therefore have current limited inputs. Finally, as power needs change from application to application, bulk converters or application-specific converters do not scale well.

Furthermore, the performance (transmission characteristics) of wire-pairs tends to change over time. Wire-pairs that are decades old tend to exhibit more resistive loss than newly installed wire-pairs. Prior art methods that employing bulk converters at the CO do not measure, and therefore compensate, for performance changes over time.

Accordingly, what is needed in the art is a system and method for providing electric power to telephone wire-pairs that meets one or more of the following objectives: does not require dedicated space, is safer than 130/190V power, does not waste power near the current limit or takes into account any changes in performance that may occur with respect to wire-pairs. What is further needed in the art is a system and method for receiving electric power from telephone wire-pairs that efficiently tailors itself to the power carrying capacity of the twisted pair. What is still further needed in the art is a system and method for providing and receiving electric power through telephone wire-pairs that scales well as application needs change.

SUMMARY OF THE INVENTION

To address the above-discussed deficiencies of the prior art, the present invention provides, in one aspect, a converter module for providing electric power to a single telephone wire-pair. In one embodiment, the converter module includes: (1) a DC/DC boost converter configured to receive input power from an existing power supply and an existing distribution bus at a central office and further configured to provide output power to the single wire-pair and (2) a current-limiting converter controller coupled to the DC/DC boost converter and configured to limit a current output of the DC/DC boost converter to the single wire-pair.

In another aspect, the present invention provides a method of providing electric power to a single telephone wire-pair. In one aspect, the method includes: (1) receiving input power into a DC/DC boost converter from an existing power supply and an existing distribution bus at a central office, (2) employing the DC/DC boost converter to provide output power to the single wire-pair and (3) controlling the DC/DC boost converter to limit a current output of the DC/DC boost converter to the single wire-pair.

In yet another aspect, the present invention provides a system for providing electric power to telephone wire-pairs. In one aspect, the system includes: (1) a plurality of DC/DC boost converters configured to receive input power from an existing power supply and an existing distribution bus at a central office and further configured to provide output power to corresponding ones of the wire-pairs and (2) a corresponding plurality of current-limiting converter controllers coupled to the plurality of DC/DC boost converters and configured to limit current outputs of the DC/DC boost converter to the corresponding ones of the wire-pairs.

In still another aspect, the present invention provides a converter module for receiving electric power from telephone wire-pairs. In one embodiment, the converter module includes: (1) a DC/DC buck converter configured to receive input power from a wire-pair and further configured to provide output power to customer premises equipment and (2) a converter controller coupled to the DC/DC buck converter and configured to limit a current input of the DC/DC buck converter from the wire-pair.

In still yet another aspect, the present invention provides a method of receiving electric power from telephone wire-pairs. In one embodiment, the method includes: (1) receiving input power into a DC/DC buck converter from a wire-pair, (2) employing the DC/DC buck converter to provide output power to customer premises equipment and (3) controlling the DC/DC buck converter to limit a current input of the DC/DC buck converter from the wire-pair.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION OF THE DRAWINGS

Before describing the FIGURES in detail, some objectives pertaining to some embodiments of the present invention will be set forth.

First, the present invention introduces the broad concept of using the electrical and mechanical equipment that already exist in a CO. By the present invention, not only can the existing power supplies, buses and even racks and distribution panels find new use, the lower voltage (48V) carried in the existing distribution panels is safer to the personnel who have to maintain and operate the CO.

Because the existing equipment, buses and distribution panels carry a relatively low voltage (e.g., 48V), the present invention, in one aspect, employs a DC/DC boost converter that converts the relatively low voltage to one that is more appropriate for transmission over local-loop wire-pairs (e.g., 130/190V). The DC/DC boost converter provides protected power (which, in one embodiment is limited to 100 VA to comply with NEC Class 2) and provides its power to a single pair of telephone wires with no aggregation. A one-to-one correspondence exists between a specific boost converter and a specific pair of wires, greatly simplifying the proper delivery of power over the wires. More specifically, the one-to-one correspondence allows the power-carrying capability of each wire-pair to be optimized or maximized by matching current limit thresholds, offset by circuit tolerances, at each end of each wire-pair to avoid mistrips. The one-to-one correspondence also allows scaling to occur gradually; wire-pairs can be activated or deactivated one or a few at a time instead of necessarily in bulk.

The DC/DC boost converter may advantageously plug in to standard existing 48V circuit breaker slots. This physical form (colloquially called a "form factor") allows existing racks and distribution panels to be used.

The present invention further introduces, in one aspect, a DC/DC buck converter on the receiving end at the customer premises. The DC/DC buck converter is preferably matched to its corresponding DC/DC boost converter (at the CO) such that the sourcing converter never operates in a current limit mode during a non-fault condition. Matching the two converters allows each specific wire-pair (having individual transmission characteristics) to be operated at maximum efficiency and safety.

The DC/DC buck converter may plug into a standard circuit breaker distribution slot. However, the physical form of the DC/DC buck converter is not perceived as being as important at the customer premises as it is at the CO.

Figure 1:
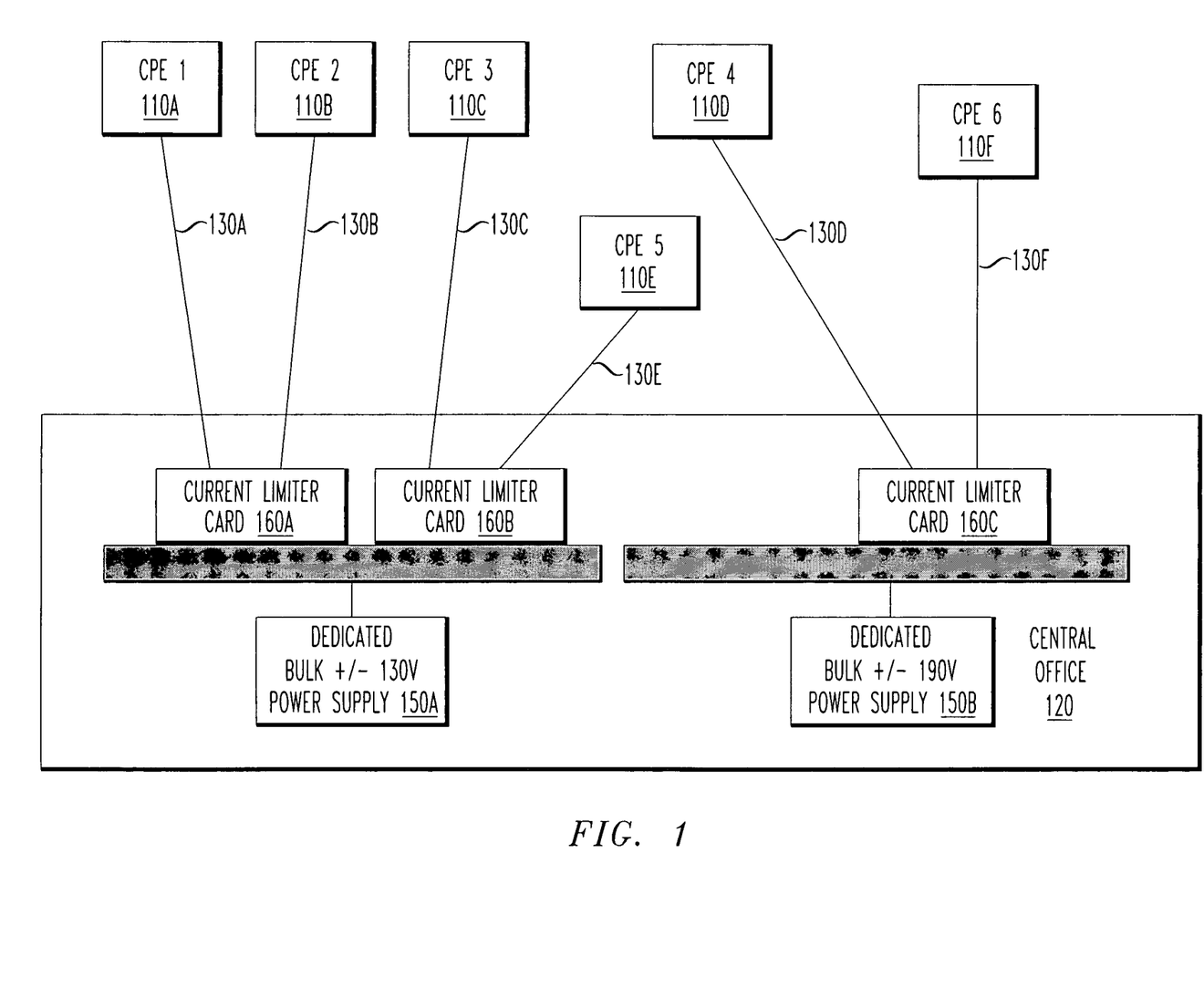
FIG. 1 illustrates a block diagram of a prior art system for providing electric power to telephone wire-pairs.

Having described some objectives pertaining to some embodiments of the present invention, the FIGURES will now be described in detail. Accordingly, referring initially to FIG. 1, illustrated is a block diagram of a prior art system for providing electric power to telephone wire-pairs. FIG. 1 highlights the sheer inefficiency and complexity that the prior art approach offered. A plurality of CPE is shown: CPE1 110*a*, CPE2 110*b*, CPE3 110*c*, CPE4 110*d*, CPE5 110*e* and CPE6 110*f*. A CO 120 is also shown.

Each of the CPEs 110*a*, 110*b*, 110*c*, 110*d*, 110*e*, 110*f* represents a different physical location and is coupled to the CO 120 by distinct corresponding wire-pairs 130*a*, 130*b*, 130*c*, 130*d*, 130*e*, 130*f*. The wire-pairs 130*a*, 130*b*, 130*c*, 130*d*, 130*e*, 130*f* each have different electrical transmission characteristics that, to complicate matters further, can change over time as wires age and repairs are made.

The CO 120 is illustrated as having separate high voltage buses, specifically, a +/−130V bus 140a and a +/−190V bus 140b. The CO 120 further contains a dedicated +/−130V bulk power supply 150a a coupled to the +/−130V bus 140a and a dedicated +/−190V bulk power supply 150b coupled to the +/−190V bus 140b.

The dedicated +/−130V bulk power supply 150 and the +/−130V bus 140a ostensibly occupy one or more dedicated 130 v racks (not shown). The dedicated +/−190V bulk power supply 150b and the +/−190V bus 140b ostensibly occupy one or more further dedicated 190V racks (not shown) that are wholly separate from the 130V racks. These dedicated racks consume substantial CO 120 space.

Bulk current limiter cards are associated with each of the +/−130V bus 140a and the +/−190V bus 140b. FIG. 1 specifically shows two bulk current limiter cards 160a, 160b coupled to the +/−130V bus 140a and one bulk current limiter card 160c coupled to the +/−190V bus 140b. The bulk current limiter card 160a is coupled to two wire-pairs, namely the wire-pair 130a and the wire-pair 130b. In a like manner, the bulk current limiter card 160b is coupled to the wire-pair 130c and the wire-pair 130e, and the bulk current limiter card 160c is coupled to the wire-pair 130d and the wire-pair 130f.

FIG. 1 does not show the existing 48V power supplies, buses and racks, distribution panels and backup battery strings that the CO 120 already has in place. These must either remain in place to service wire-pairs that remain in service for bearing voice traffic or must be disposed of to make room for what FIG. 1 does show.

At least three significant disadvantages are apparent from an examination of the prior art system of FIG. 1. First, new infrastructure (power supplies, buses and racks must be purchased and installed and occupy space in the CO 120. Second, the new infrastructure uses unprotected high voltage power, which represents a significant safety hazard. And third, each bulk current limiter card 160a, 160b, 160c must limit current on multiple wire-pairs, which is a complex and potentially inefficient or ineffective function.

Figure 2:
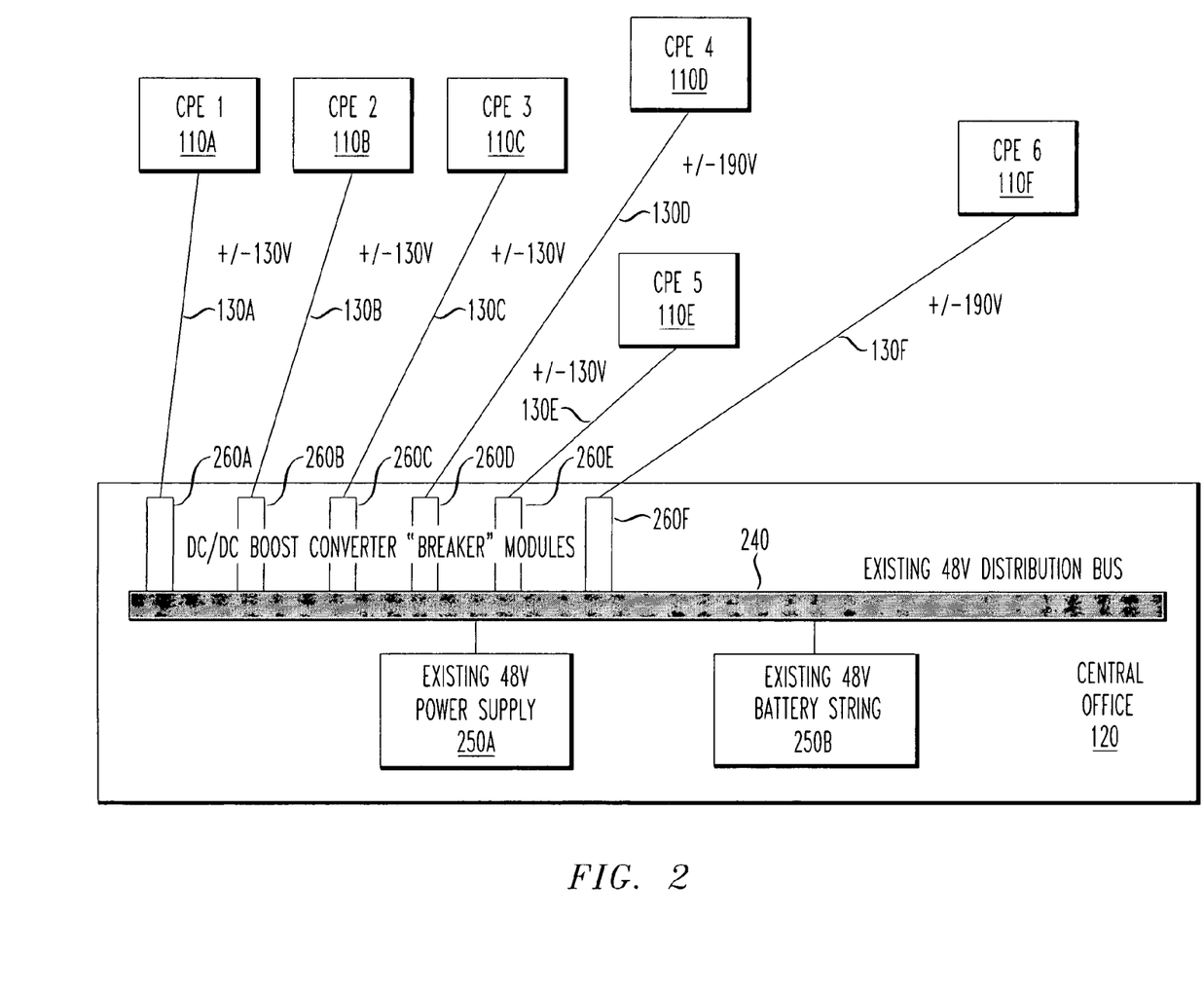
FIG. 2 illustrates a block diagram of one embodiment of a system for providing electric power to telephone wire-pairs constructed according to the principles of the present invention.

Turning now to FIG. 2, illustrated is a block diagram of one embodiment of a system for providing electric power to telephone wire-pairs constructed according to the principles of the present invention.

The CPE 110a, 110b, 110c, 110d, 110e, 110f are still coupled to the CO 120 by corresponding wire-pairs 130a, 130b, 130c, 130d, 130e, 130f. However, gone are the dedicated +/−130V bus 140a, the +/−190V bus 140b, +/−130V bulk power supply 150a, +/−190V bulk power supply 150b and bulk current limiter cards 160a, 160b, 160c. Instead, the existing 48V distribution bus 240 of the CO 120 is coupled to an existing 48V power supply 250a and an existing 48V backup battery string 250b. A plurality of DC/DC boost converter modules 260a, 260b, 260c, 260d, 260e, 260f are coupled to the existing 48V distribution bus 240 and the wire-pairs 130a, 130b, 130c, 130d, 130e, 130f in a one-to-one correspondence. In the embodiment of FIG. 2, the DC/DC boost converter modules 260a, 260b, 260c, 260d, 260e, 260f assume the physical form of conventional "breaker" modules that fit within an existing 48V distribution panel (not shown) that contains the existing 48V distribution bus 240.

Figure 3:
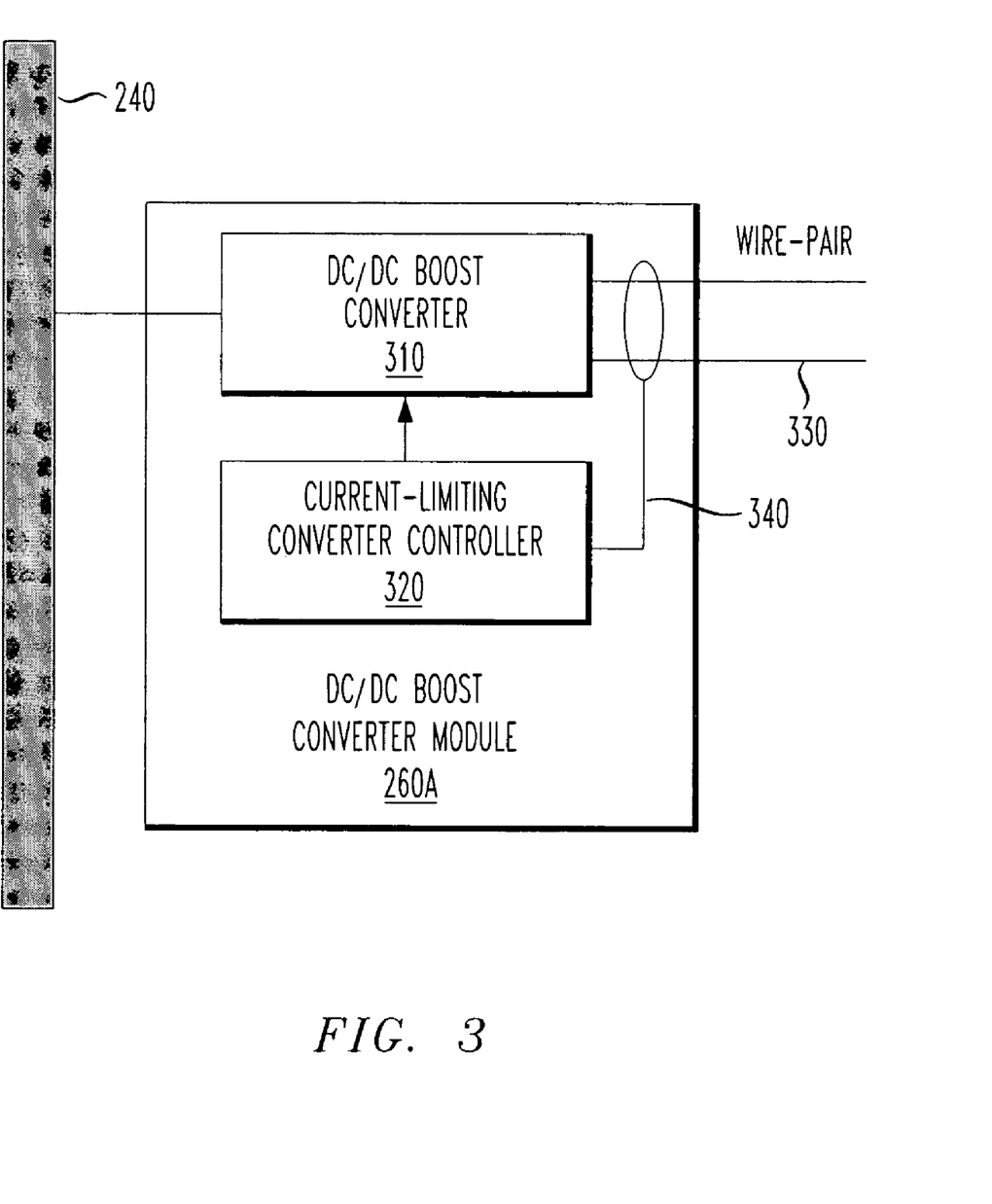
FIG. 3 illustrates a block diagram of one embodiment of a DC/DC boost converter module constructed according to the principles of the present invention.

Turning now to FIG. 3, illustrated is a block diagram of one embodiment of a DC/DC boost converter module (e.g., the converter module 260a of FIG. 2) constructed according to the principles of the present invention. Electrically, the illustrated embodiment of the converter module 260a is characterized by a current-limited input that transfers as much power as possible through a wire-pair without putting the boost converter into current or power limit modes.

The converter module 260a includes a DC/DC boost converter 310, which, in the illustrated embodiment is transformer-isolated. The DC/DC boost converter 310 is configured to receive input power from an existing power supply via an existing distribution bus (the 48V distribution bus 240 in the illustrated embodiment). The DC/DC boost converter 310 is further configured to provide output power to a single wire-pair (e.g., the wire-pair 330). Two or more wire-pairs may, of course, be used in parallel instead of a single wire-pair, to reduce losses and allow the local loop to be longer. The definition of "wire-pair" therefore includes multiple parallel pairs that act as a single wire-pair.

The DC/DC boost converter 310 may be of conventional topology. In the illustrated embodiment, the DC/DC boost converter 310 converts a 48V input to a positive or negative 130V or positive or negative 190V output (which is at least about 60V). Those skilled in the pertinent art understand the structure and function of DC/DC boost converters suitable for operating as the DC/DC boost converter 310.

The converter module 260a further includes a current-limiting converter controller 320. The current-limiting converter controller 320 is coupled to the DC/DC boost converter 310 and is configured to limit a current output of the DC/DC boost converter 310 to the single wire-pair 330.

The current-limiting converter controller 320 may be of conventional topology. In the illustrated embodiment, the current-limiting converter controller 320 controls the operation of the DC/DC boost converter to maintain the desired output voltage without exceeding the 100 VA limit NEC Class 2 imposes on the wire-pair 330. Those skilled in the pertinent art understand the structure and function of current-limiting converter controllers suitable for operating as the current-limiting converter controller 320.

Figure 4:
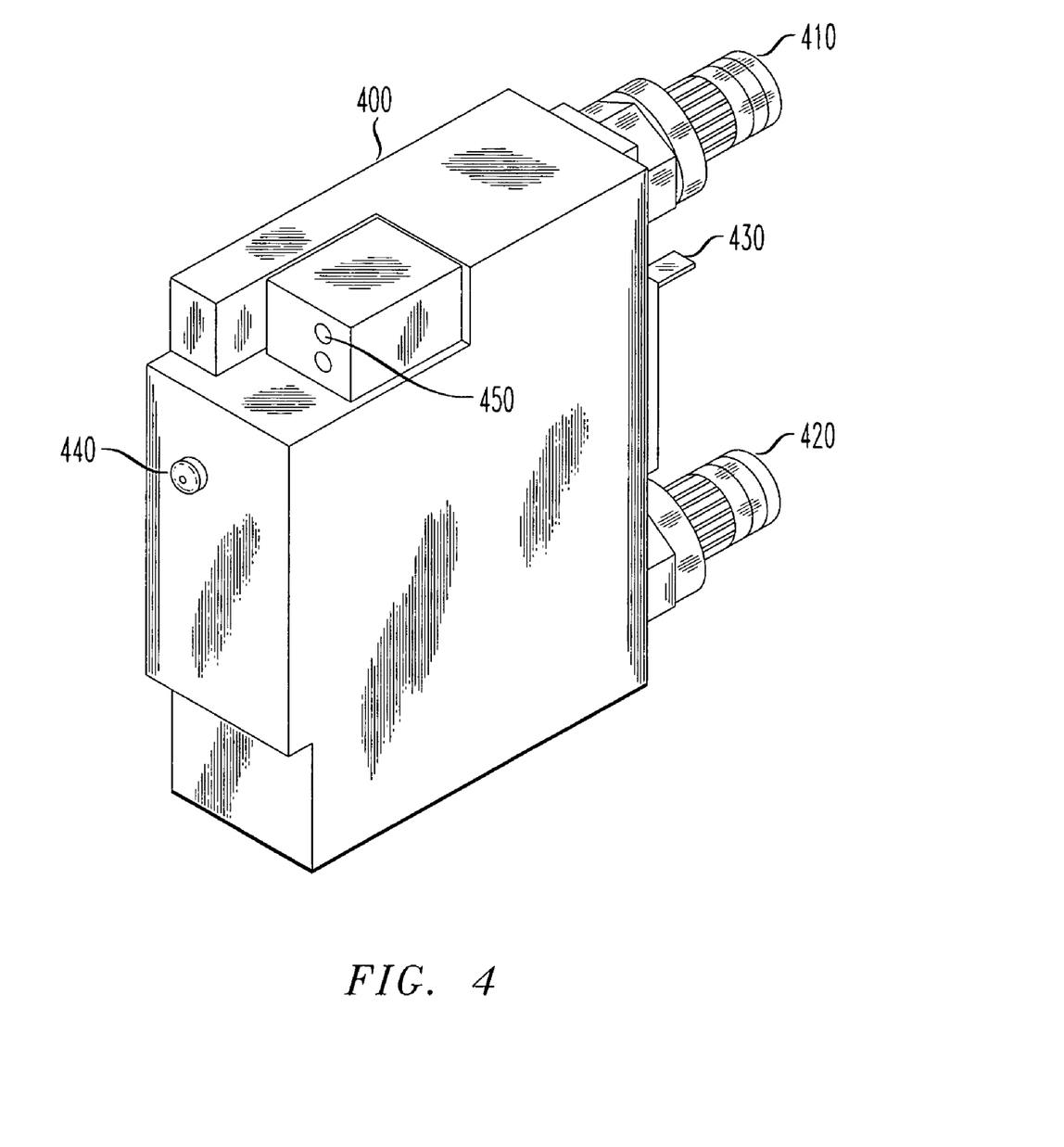
FIG. 4 illustrates an isometric view of one embodiment of the DC/DC boost converter module of FIG. 3 wherein the module assumes the physical form of a conventional "breaker" module.

Turning now to FIG. 4, illustrated is an isometric view of one embodiment of the converter module 260a of FIG. 3 wherein the converter module 260a assumes the physical form of a conventional "breaker" module.

The converter module 260a includes a housing 400. The housing 400 contains the DC/DC boost converter and the current-limiting converter controller (not shown). Input terminals 410, 420 are associated with one surface (e.g., a rear surface) of the housing 400. The input terminals 410 are coupled to the DC/DC boost converter located in the housing 400. An alarm contact 430 provides status information about the converter module that can be remotely monitored. A status-indicating light 440 is coupled to the housing 400 (e.g., a front surface of the housing 400). The status-indicating light 440 is configured to display status information with respect to the converter module. Those skilled in the pertinent art are familiar with the kinds of status information that may be provided via the alarm contact 430 or the status-indicating light 440. For example, the status-indicating light 440 may indicate when a DC/DC buck converter associated with the converter module is unable to maintain a desired output voltage without exceeding the input current limit. This may indicate that output voltages may need to be increased. This operation will be described in greater detail below.

Output terminals 450 are associated with a surface of the housing that is distal from the surface of the housing 400 on which the input terminals 410, 420 are located. The output terminals 450 are coupled to the DC/DC boost converter within the housing 400. In the illustrated embodiment, the output terminals 450 are located on the front surface of the housing 400, allowing access to be gained to them when the converter module is mounted in a distribution panel. Of course, the present invention does not restrict where the output terminals 450 may be located.

Figure 5:
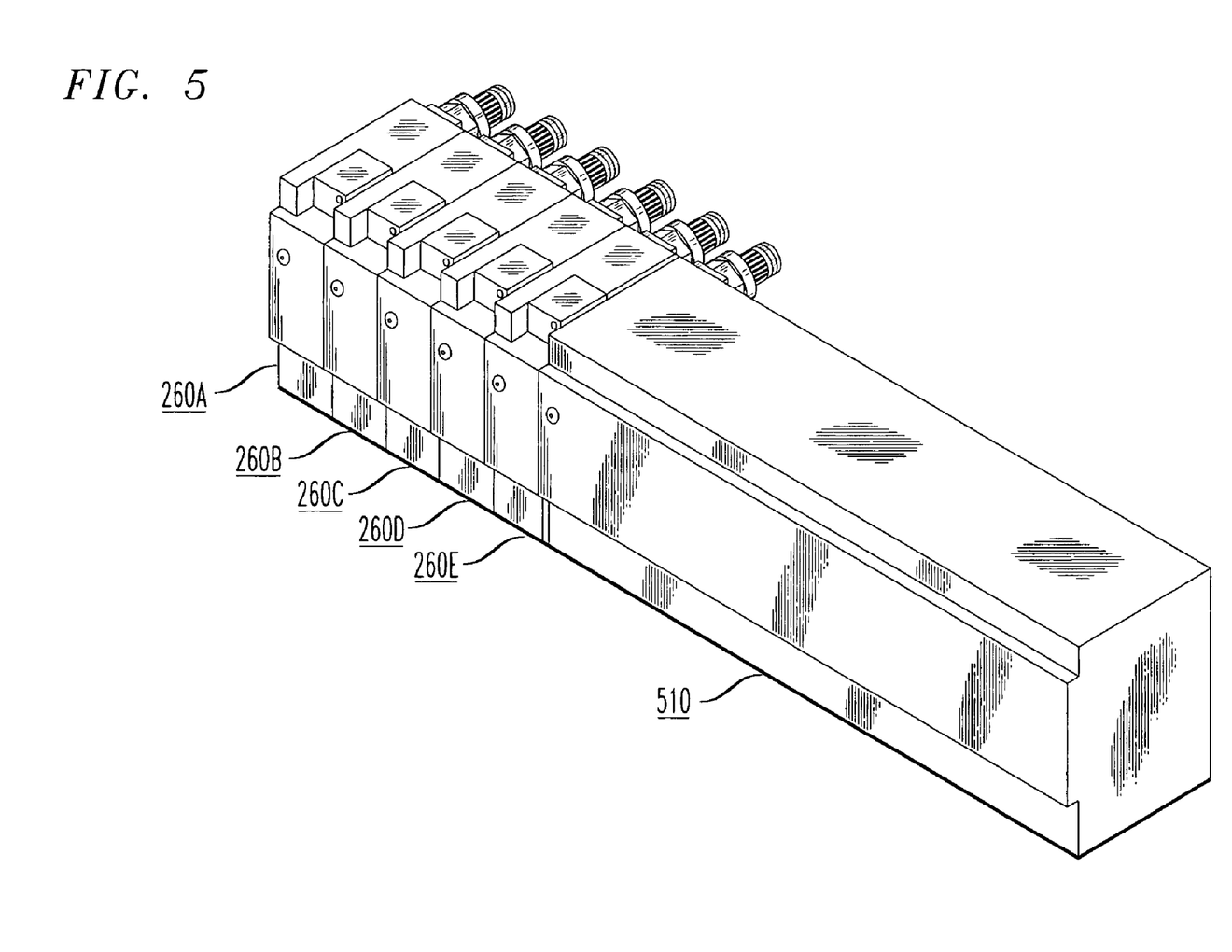
FIG. 5 illustrates an isometric view of one embodiment of a plurality of DC/DC boost converter "breaker" modules of FIG. 3 installed in-line with a majority-load AC-DC converter.

Turning now to FIG. 5, illustrated is an isometric view of one embodiment of a plurality of DC/DC boost converter "breaker" modules of FIG. 3 installed in-line with a majority-load AC-DC converter. FIG. 5 is presented primarily for the purpose of illustrating a plurality of converter modules 260*a*, 260*b*, 260*c*, 260*d*, 260*e* mounted side-by-side as would be the case in a conventional distribution panel. FIG. 5 also shows an AC/DC converter 510. The AC/DC converter 510 may be configured to carry a load during heat exchange startup and other surge loading conditions that occur only when AC grid-powered load equipment is operational. Since the AC/DC converter 510 is not necessarily limited to 100 VA, it may be bigger, perhaps in the kilowatt range.

Figure 6:
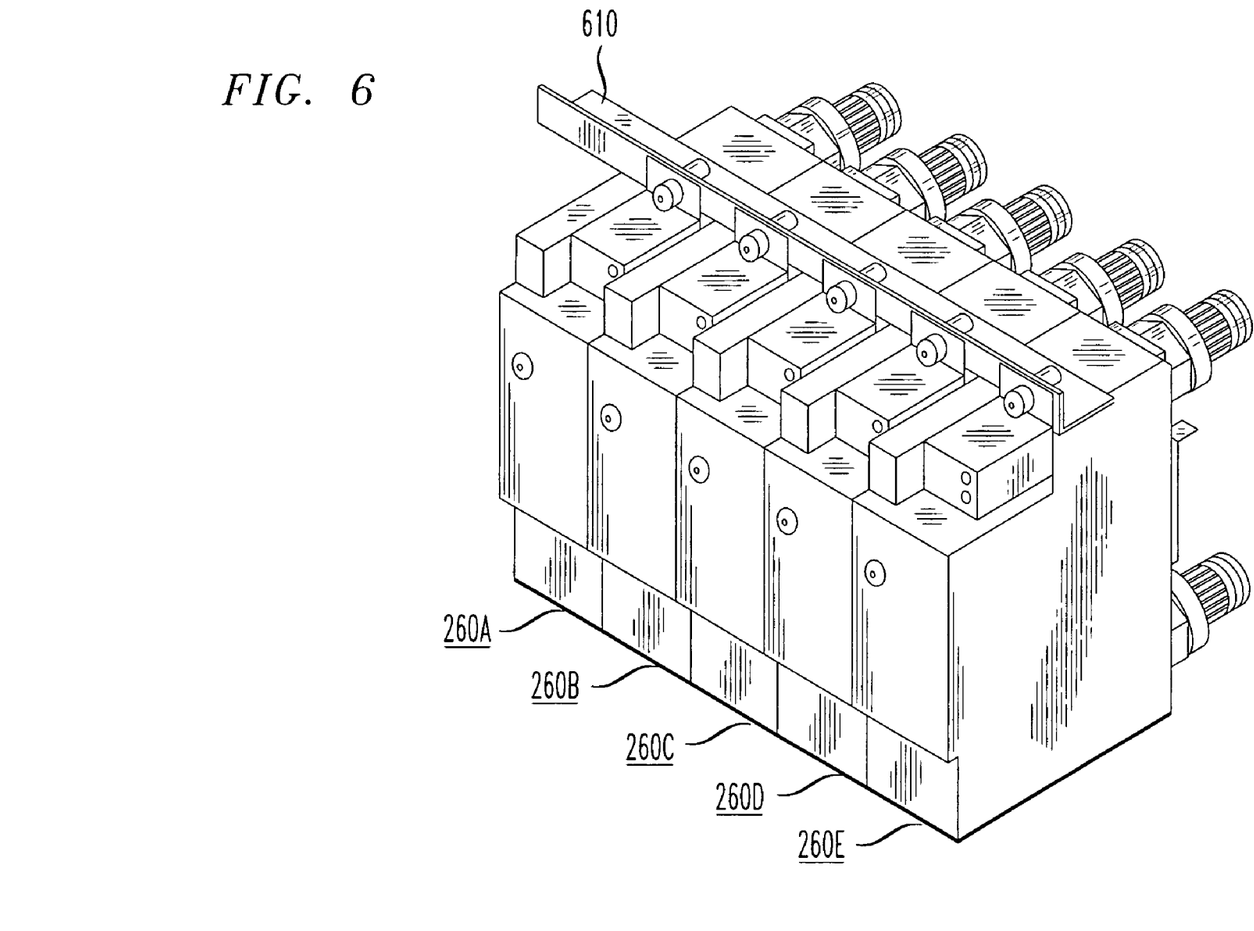
FIG. 6 illustrates an isometric view of one embodiment of a plurality of DC/DC boost converter "breaker" modules of FIG. 3 with a grounding bar spanning and forming a common ground for the plurality.

Turning now to FIG. 6, illustrated is an isometric view of one embodiment of a plurality of DC/DC boost converter "breaker" modules of FIG. 3 with a grounding bar spanning and forming a common ground for the plurality. FIG. 6 is presented primarily for the purpose of illustrating a plurality of converter modules 260*a*, 260*b*, 260*c*, 260*d*, 260*e* mounted side-by-side as in FIG. 5, but this time including a grounding bar 610. The grounding bar 610 spans and provides a common ground for converter modules 260*a*, 260*b*, 260*c*, 260*d*, 260*e*.

The grounding bar 610 may be located in the arc vent space available on a conventional distribution panel. The grounding bar 610 allows for lightning protection circuitry to operate where the wire-pairs (not shown) enter the converter modules 260*a*, 260*b*, 260*c*, 260*d*, 260*e*. Traditional threaded fasteners may be used to couple the grounding bar 610 to the various converter modules 260*a*, 260*b*, 260*c*, 260*d*, 260*e*. Other implementations may use a simple low-profile wipe connection to a substantially flat grounding bar 610.

Figure 7:
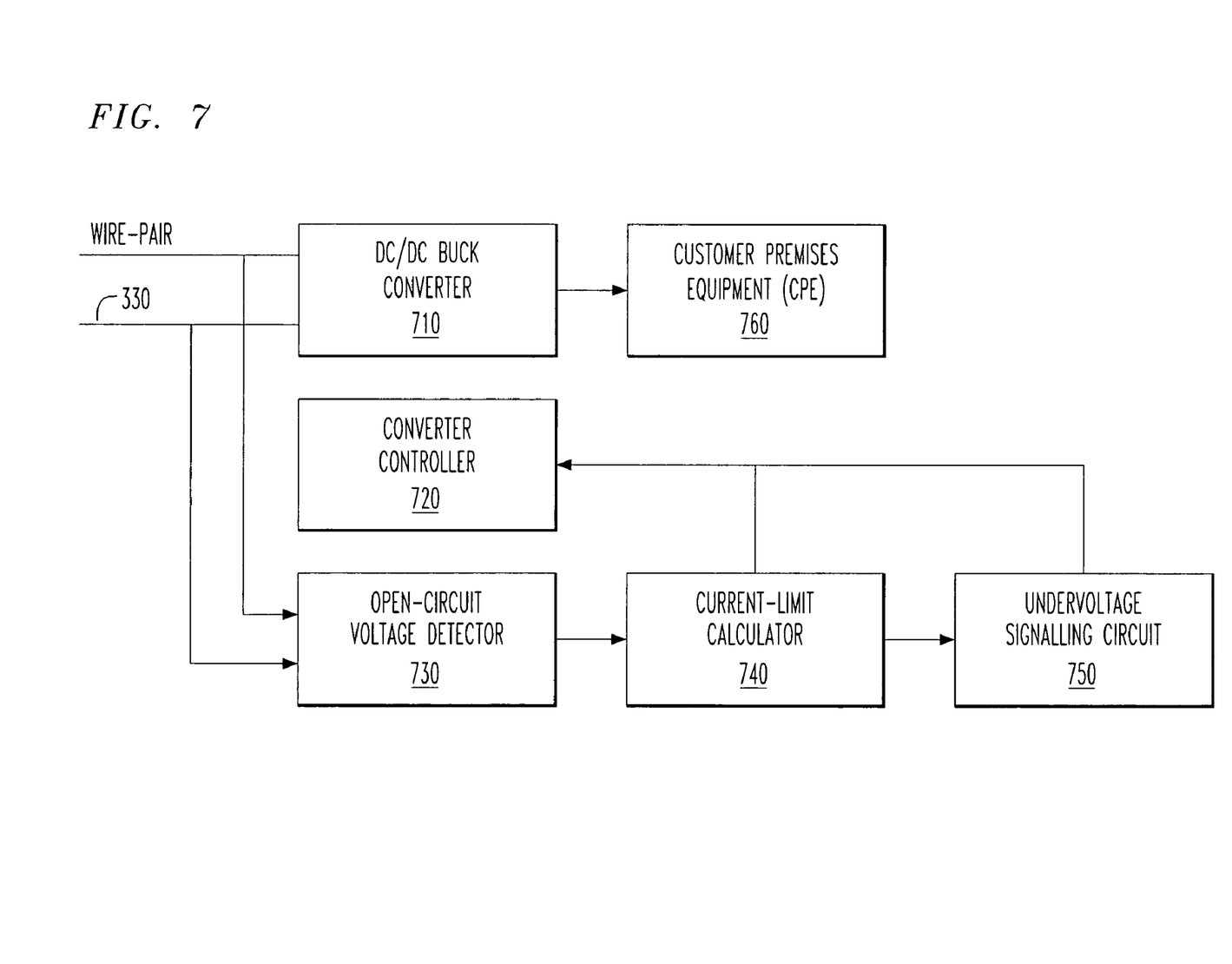
FIG. 7 illustrates a block diagram of one embodiment of a DC/DC buck converter module constructed according to the principles of the present invention.

Turning now to FIG. 7, illustrated is a block diagram of one embodiment of a DC/DC buck converter module constructed according to the principles of the present invention. The DC/DC buck converter module is configured to receive electric power from telephone wire-pairs.

The DC/DC buck converter module includes a DC/DC buck converter 710, which, in the illustrated embodiment is transformer-isolated. The DC/DC buck converter 710 is configured to receive input power from a wire-pair 330. The DC/DC buck converter 710 is further configured to provide output power to CPE 760. Those skilled in the pertinent art understand the structure and function of DC/DC buck converters suitable for operating as the DC/DC buck converter 710.

A converter controller 720 is coupled to the DC/DC buck converter 710. The converter controller 720 is configured to limit a current input of the DC/DC buck converter 710 from the wire-pair 330. Electrically, the converter controller 720 is characterized by a current limited input that transfers as much power as possible through the wire-pair 330 without putting the DC/DC boost converter at the CO into a current or power limit mode. Those skilled in the pertinent art understand the structure and function of converter controllers suitable for operating as the converter controller 720.

An open-circuit voltage detector 730 is coupled to the wire-pair 330. The open-circuit voltage detector 730 is configured to detect an open-circuit voltage of the wire-pair 330.

A current limit calculator 740 is coupled to the open-circuit voltage detector 730 and the converter controller 720. The current limit calculator 740 is configured to determine an input current limit based on the open-circuit voltage detected by the open-circuit voltage detector 730.

An undervoltage signaling circuit 750 is coupled to the current-limit calculator 740 and the converter controller 720. The undervoltage signaling circuit 750 is configured to cause the converter controller 720 to generate a signal on the wire-pair 330 indicating that the DC/DC buck converter 710 is unable to maintain a desired output voltage without exceeding the input current limit.

In the illustrated embodiment, the converter controller 720, the open-circuit voltage detector 730, the current-limit calculator 740 and the undervoltage signaling circuit 750 cooperate as follows. After the open-circuit voltage detector 730 has measured the open circuit voltage of the wire-pair 330 and the converter controller 720 has set its input current limit to keep the DC/DC boost converter (e.g., 260*a* of FIG. 2) at the CO below the 100 VA limit, the converter controller 720 determines if the output voltage of the DC/DC buck converter 710 is within design limits. If the DC/DC buck converter 710 is unable to maintain the desired output voltage without exceeding the calculated input current limit, the undervoltage signaling circuit 750 causes the converter controller 720 to control the DC/DC buck converter 710 such that it intermittently short-circuits the wire-pair 330 in a signaling manner and thereby communicates to the DC/DC boost converter (e.g., 260*a* of FIG. 2). In the illustrated embodiment, the DC/DC boost converter (e.g., 260*a* of FIG. 2) responds by shifting into a current limit mode of operation.

The above is a relatively simple communication method. In alternative embodiments, communication may be effected by transmitting radio frequency signals over the wire-pair or by a separate channel (e.g., a wireless or optical link). With such more sophisticated communication, the present invention encompasses transmission of more detailed information regarding the operation of the buck converter module or the boost converter module from one to the other.

Turning back briefly to FIG. 4, the status-indicating light 440 can display the signaling to CO personnel. The CO personnel could interpret the signaling as a need for additional powering circuits or a higher output voltage. The CO personnel could swap the converter module for one having a higher output voltage. Alternatively, the CO personnel could select a higher drive voltage by manually flipping a switch on a dual- or multiple-output voltage converter module. The converter module could be provided with an auto-adjust function (e.g., trying −130 volts first; if that does not work, −190V; if that does not work, +/−130V; and if that does not work, +/−190V), thereby eliminating a need for the CO personnel to intervene. In alternative embodiments, the process of monitoring the converter modules may be automated by employing a computer network to remotely detect current-limit operation.

Other signaling information may include confirmation of output voltage by the DC/DC buck converter 710. This supports efficient power conversion by the DC/DC buck converter 710 by having multiple wire-pairs driving multiple DC/DC buck converters to provide power at end-use voltages, for example redundant converters providing 3.3V or redundant converters providing 48V.

The benefits are rapid provisioning and configuration of power circuits by field personnel. One end of a given wire-pair can be worked on at one time. Real-time feedback about the performance (e.g., resistive loss) of real installed wire-pairs, that have been in the field for an extended period of time, can be received. The signaling can also allow personnel to properly configure redundant circuits.

In one embodiment of the present invention, the converter module at the customer premises may include a housing containing the DC/DC buck converter 710 and the converter controller 720 and having a breaker module physical form as FIG. 4 illustrates.

Figure 8:
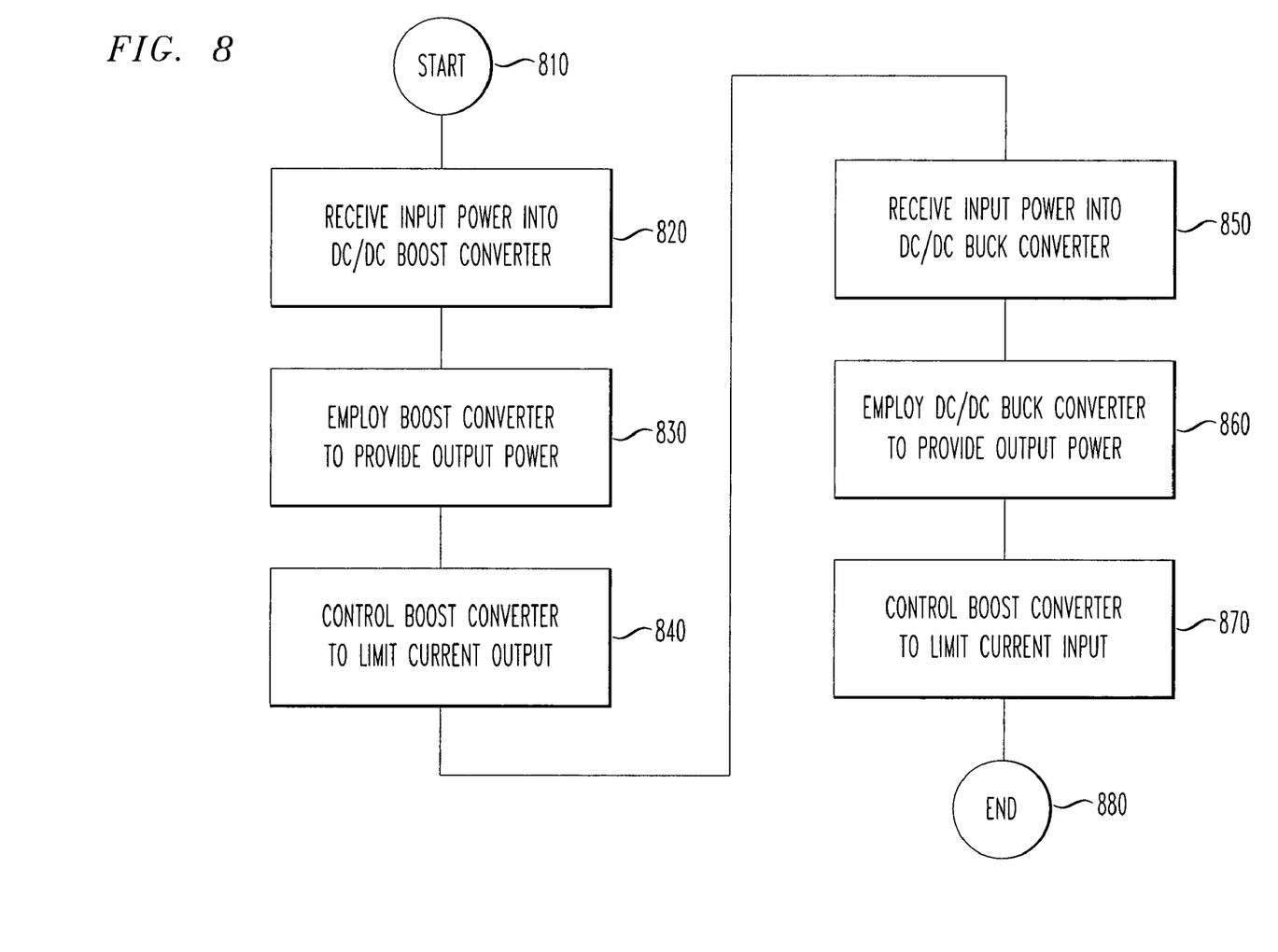
FIG. 8 illustrates a flow diagram of one embodiment of a method of providing and receiving electric power through telephone wire-pairs carried out according to the principles of the present invention.

Turning now to FIG. 8, illustrated is a flow diagram of one embodiment of a method of providing and receiving electric power through telephone wire-pairs carried out according to the principles of the present invention.

The method begins in a start step 810 when it is desired to transmit power from a CO to CPE via a wire-pair. In a step 820, input power is received into a DC/DC boost converter from an existing power supply and an existing distribution bus at a CO. In a step 830, the DC/DC boost converter is employed to provide output power to the single wire-pair. In a step 840, the DC/DC boost converter is controlled to limit a current output of the DC/DC boost converter to the single wire-pair. In a step 850 input power is received into a DC/DC buck converter located proximate the CPE from the wire-pair. In a step 860, the DC/DC buck converter is employed to provide output power to the CPE. In a step 870, the DC/DC buck converter is controlled to limit a current input of the DC/DC buck converter from the wire-pair. The method ends in a step 880.

Although the present invention has been described in detail, those skilled in the art should understand that they can make various changes, substitutions and alterations herein without departing from the spirit and scope of the invention in its broadest form.

What is claimed is:

1. A converter module for providing electric power to a single telephone wire-pair, comprising:
   a DC/DC boost converter configured to receive input power from an existing power supply and an existing distribution bus at a central office and further configured to provide output power to said single wire-pair;
   a current-limiting converter controller coupled to said DC/DC boost converter and configured to limit a current output of said DC/DC boost converter to said single wire-pair; and
   a housing containing said DC/DC boost converter and said current-limiting converter controller and having a breaker module physical form.

2. The converter module as recited in claim 1 wherein said existing distribution bus carries a voltage of about 48 volts and said DC/DC boost converter is transformer-isolated and provides said output power at a voltage of at least about 60 volts.

3. The converter module as recited in claim 1 further comprising:
   input terminals associated with one surface of said housing and coupled to said DC/DC boost converter; and
   output terminals associated with a distal surface of said housing and coupled to said DC/DC boost converter.

4. The converter module as recited in claim 1 wherein said breaker module physical form is configured to fit within an existing power distribution panel associated with said existing distribution bus.

5. The converter module as recited in claim 1 further comprising:
   a status-indicating light coupled to said housing.

6. A method of providing electric power to a single telephone wire-pair, comprising:

receiving input power into a DC/DC boost converter from an existing power supply and an existing distribution bus at a central office;
employing said DC/DC boost converter to provide output power to said single wire-pair; and
controlling said DC/DC boost converter to limit a current output of said DC/DC boost converter to said single wire-pair, wherein said DC/DC boost converter and a current-limiting converter controller providing said controlling are contained within a housing having a breaker module physical form.

7. The method as recited in claim 6 wherein said existing distribution bus carries a voltage of about 48 volts and said DC/DC boost converter is transformer-isolated and provides said output power at a voltage of at least about 60 volts.

8. The method as recited in claim 6 wherein said housing has input terminals associated with one surface of said housing and coupled to said DC/DC boost converter and output terminals associated with a distal surface of said housing and coupled to said DC/DC boost converter.

9. The method as recited in claim 6 wherein said breaker module physical form is configured to fit within an existing power distribution panel associated with said existing distribution bus.

10. The method as recited in claim 6 wherein said housing includes a status-indicating light coupled thereto.

11. A system for providing electric power to telephone wire-pairs, comprising:
    a plurality of DC/DC boost converters configured to receive input power from an existing power supply and an existing distribution bus at a central office and further configured to provide output power to corresponding ones of said wire-pairs; and
    a corresponding plurality of current-limiting converter controllers coupled to said plurality of DC/DC boost converters and configured to limit current outputs of said DC/DC boost converter to said corresponding ones of said wire-pairs, wherein each of said plurality of DC/DC boost converters and a corresponding one of said corresponding plurality of current-limiting converter controllers is contained in a housing having a breaker module physical form.

12. The system as recited in claim 11 wherein said existing distribution bus carries a voltage of about 48 volts and each of said plurality of DC/DC boost converters is transformer-isolated and provides said output power at a voltage of at least about 60 volts.

13. The system as recited in claim 11 wherein said housing has input terminals associated with one surface of said housing and coupled to said DC/DC boost converter and output terminals associated with a distal surface of said housing and coupled to said DC/DC boost converter.

14. The system as recited in claim 11 wherein said breaker module physical form is configured to fit within an existing power distribution panel associated with said existing distribution bus and to receive a grounding bar spanning and providing a common ground for said plurality of DC/DC boost converters.

15. The system as recited in claim 11 wherein housing includes a status-indicating light coupled thereto.

16. A converter module for receiving electric power from telephone wire-pairs, comprising:
    a DC/DC buck converter configured to receive input power from a wire-pair and further configured to provide output power to customer premises equipment;

a converter controller coupled to said DC/DC buck converter and configured to limit a current input of said DC/DC buck converter from said wire-pair; and a housing containing said DC/DC buck converter and said converter controller and having a breaker module physical form.

17. The converter module as recited in claim 16 further comprising an open-circuit voltage detector associated with to said DC/DC buck converter and configured to detect an open-circuit voltage of said wire-pair, said DC/DC buck converter being transformer-isolated.

18. The converter module as recited in claim 17 further comprising a current limit calculator coupled to said open-circuit voltage detector and said converter controller and configured to determine an input current limit based on said open-circuit voltage.

19. The converter module as recited in claim 18 further comprising an undervoltage signaling circuit coupled to said current-limit calculator and said converter controller and configured to cause said converter controller to generate a signal on said wire-pair indicating that the DC/DC buck converter is unable to maintain a desired output voltage without exceeding said input current limit.

20. A method of receiving electric power from telephone wire-pairs, comprising:

receiving input power into a DC/DC buck converter from a wire-pair;

employing said DC/DC buck converter to provide output power to customer premises equipment; and controlling said DC/DC buck converter to limit a current input of said DC/DC buck converter from said wire-pair, wherein said DC/DC buck converter and a converter controller for providing said controlling are contained within a housing having a breaker module physical form.

21. The method as recited in claim 20 further comprising detecting an open-circuit voltage of said wire-pair, said DC/DC buck converter being transformer-isolated.

22. The method as recited in claim 21 further comprising determining an input current limit based on said open-circuit voltage.

23. The method as recited in claim 22 further comprising causing said converter controller to generate a signal on said wire-pair indicating that the DC/DC buck converter is unable to maintain a desired output voltage without exceeding said input current limit.

* * * * *